US010502499B2

(12) United States Patent
Fujisaki et al.

(10) Patent No.: US 10,502,499 B2
(45) Date of Patent: Dec. 10, 2019

(54) HEAT STORAGE MOLDED BODY, HEAT STORAGE LAMINATE, AND HEAT STORAGE MOLDED BODY PRODUCTION METHOD

(71) Applicant: DIC Corporation, Tokyo (JP)

(72) Inventors: Kenichi Fujisaki, Saitama (JP); Yuko Koseki, Saitama (JP)

(73) Assignee: DIC Corporation, Tokyo (JP)

( * ) Notice: Subject to any disclaimer, the term of this patent is extended or adjusted under 35 U.S.C. 154(b) by 69 days.

(21) Appl. No.: 15/831,602

(22) Filed: Dec. 5, 2017

(65) Prior Publication Data

US 2018/0094872 A1  Apr. 5, 2018

Related U.S. Application Data

(63) Continuation of application No. PCT/JP2016/068377, filed on Jun. 21, 2016.

(30) Foreign Application Priority Data

Jun. 23, 2015 (JP) ................... 2015-125642
Jun. 23, 2015 (JP) ................... 2015-125644
Jun. 23, 2015 (JP) ................... 2015-125645

(51) Int. Cl.

| F28D 20/02 | (2006.01) |
|---|---|
| B32B 27/22 | (2006.01) |
| B32B 27/18 | (2006.01) |
| C08K 9/10 | (2006.01) |
| C08L 101/00 | (2006.01) |
| C09K 5/06 | (2006.01) |
| B32B 27/30 | (2006.01) |
| B32B 27/14 | (2006.01) |
| B32B 27/36 | (2006.01) |
| B32B 15/088 | (2006.01) |
| B32B 15/20 | (2006.01) |
| C08K 5/00 | (2006.01) |
| B32B 27/06 | (2006.01) |
| B32B 15/09 | (2006.01) |
| B32B 15/085 | (2006.01) |
| B32B 9/00 | (2006.01) |
| B32B 15/082 | (2006.01) |
| B32B 27/28 | (2006.01) |
| B32B 27/32 | (2006.01) |
| B32B 27/10 | (2006.01) |
| B32B 9/04 | (2006.01) |
| B32B 27/08 | (2006.01) |

(Continued)

(52) U.S. Cl.

CPC .............. *F28D 20/023* (2013.01); *B32B 5/16* (2013.01); *B32B 5/18* (2013.01); *B32B 5/30* (2013.01); *B32B 9/007* (2013.01); *B32B 9/045* (2013.01); *B32B 9/048* (2013.01); *B32B 15/08* (2013.01); *B32B 15/082* (2013.01); *B32B 15/085* (2013.01); *B32B 15/088* (2013.01); *B32B 15/09* (2013.01); *B32B 15/095* (2013.01); *B32B 15/20* (2013.01); *B32B 27/065* (2013.01); *B32B 27/08* (2013.01); *B32B 27/10* (2013.01); *B32B 27/14* (2013.01); *B32B 27/18* (2013.01); *B32B 27/22* (2013.01); *B32B 27/281* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *C08K 5/0016* (2013.01); *C08K 9/10* (2013.01); *C08L 101/00* (2013.01); *C09K 5/063* (2013.01); *B32B 2255/10* (2013.01); *B32B 2255/205* (2013.01); *B32B 2255/26* (2013.01); *B32B 2260/028* (2013.01); *B32B 2260/04* (2013.01); *B32B 2264/025* (2013.01); *B32B 2264/101* (2013.01); *B32B 2264/102* (2013.01); *B32B 2266/025* (2013.01); *B32B 2266/0228* (2013.01); *B32B 2266/0278* (2013.01); *B32B 2266/0285* (2013.01); *B32B 2307/302* (2013.01); *B32B 2307/304* (2013.01); *B32B 2307/306* (2013.01); *B32B 2307/3065* (2013.01); *B32B 2307/54* (2013.01); *B32B 2307/546* (2013.01); *B32B 2307/58* (2013.01); *B32B 2307/732* (2013.01); *B32B 2419/00* (2013.01); *B32B 2457/00* (2013.01); *B32B 2457/10* (2013.01); *B32B 2509/10* (2013.01); *B32B 2605/003* (2013.01); *B32B 2605/10* (2013.01); *B32B 2605/18* (2013.01); *B32B 2607/02* (2013.01); *F28D 20/02* (2013.01); *F28D 20/021* (2013.01)

(58) Field of Classification Search

CPC ...... F28D 20/02; F28D 20/021; F28D 20/023; B32B 27/18; B32B 27/22; B32B 2307/304; C08K 9/10; C08L 101/00; C09K 5/063

USPC ..................................... 165/104.11
See application file for complete search history.

(56) References Cited

U.S. PATENT DOCUMENTS

2011/0281070 A1* 11/2011 Mittal ............... H01L 31/02246
428/142
2019/0169390 A1* 6/2019 Peterson ................ C08J 9/0009

FOREIGN PATENT DOCUMENTS

JP  2003-284939 A  10/2003
JP  2009-51016 A  3/2009

* cited by examiner

Primary Examiner — Joel M Attey
(74) *Attorney, Agent, or Firm* — Osha Liang LLP

(57) ABSTRACT

A heat storage molded body includes a heat storage medium dispersed in a resin matrix, wherein the resin matrix includes a resin composition containing a thermoplastic resin and a non-phthalate plasticizer, and wherein the Hansen Solubility Parameter (HSP) distance between the non-phthalate plasticizer and the heat storage medium is 6 or more.

9 Claims, No Drawings

(51) Int. Cl.
*B32B 27/40* (2006.01)
*B32B 15/08* (2006.01)
*B32B 5/30* (2006.01)
*B32B 27/34* (2006.01)
*B32B 5/18* (2006.01)
*B32B 15/095* (2006.01)
*B32B 5/16* (2006.01)

HEAT STORAGE MOLDED BODY, HEAT STORAGE LAMINATE, AND HEAT STORAGE MOLDED BODY PRODUCTION METHOD

TECHNICAL FIELD

One or more embodiments of the present invention relate to a heat storage molded body that enables proper-temperature retention and energy saving for various use applications. It particularly relates to a heat storage molded body useful for proper-temperature retention in a residential space of a house or the like or an indoor space of an automobile or the like.

BACKGROUND

In recent years, there is an increasing demand for energy saving in residential spaces of houses, offices, and the like, and building materials used for houses and the like are also required to contribute to energy saving. Generally, attempts have been made to increase the cooling/heating efficiency by using a heat insulation material for the floor, ceiling, wall surface, or the like. However, for further energy saving, various materials have been studied. In addition, similarly, there also is a high demand for energy saving in closed spaces of automobiles, aircrafts, and the like, and the inside of refrigerators of refrigerator cars and the like.

As such a material, for example, a material obtained by mixing an encapsulated latent heat storage medium with a gypsum board is disclosed (see PTL 1). In addition, as a material using a flexible material, for example, a heat-storing thermoplastic resin sheet containing a heat storage medium in a thermoplastic resin is disclosed (see PTL 2).

CITATION LIST

Patent Literature

[PTL 1] JP-A-2003-284939
[PTL 2] JP-A-2009-51016

The material obtained by mixing a latent heat storage medium with a gypsum board described above is used for a wall surface or the like to increase the heat capacity of the wall surface or the like, thereby achieving energy saving. However, this material is poor in flexibility and handleability, and therefore, use applications thereof are limited.

The sheet including a thermoplastic resin described above has flexibility due to the thermoplastic resin. However, the sheet includes a phthalate material, which is an issue of concern as a substance that disrupts the endocrine action and adversely affects the reproduction/growth of wildlife and humans (environmental hormone). Heat-storing materials are often used in a space near a human body. Accordingly, a heat storage medium having a reduced phthalate content has been demanded.

However, with the respect to a heat storage molded body containing a heat storage medium is formed dispensing with a phthalate material, volumetric shrinkage may occur at high temperatures, thereby making it difficult to achieve favorable heat resistance.

SUMMARY

One or more embodiments of the present invention provide, while suppressing use of a phthalate material, a heat storage molded body having excellent flexibility and heat resistance and also having heat storage properties capable of contributing to proper-temperature retention according to a use application thereof.

One or more embodiments of the present invention provide a heat storage molded body capable of favorably suppressing the bleed-out of a plasticizer or a latent heat storage medium.

According to one or more embodiments of the present invention, a heat storage molded body includes a heat storage medium dispersed in a resin matrix, in which the resin matrix includes a resin composition containing a thermoplastic resin and a plasticizer, the plasticizer is a non-phthalate plasticizer, and the HSP distance between the plasticizer and the heat storage medium is 6 or more.

In the heat storage molded body according to one or more embodiments of the present invention, the HSP distance between the non-phthalate plasticizer used in the resin composition and the heat storage medium dispersed in the molded body is 6 or more. As a result, components which may be desorbed from the heat storage molded body at high temperatures can be suppressed from being desorbed, and therefore, both excellent heat storage properties and favorable heat resistance can be achieved. In addition, since a resin composition containing a thermoplastic resin and a plasticizer is used as a matrix material, the heat storage molded body has excellent flexibility and handleability as compared with rigid materials such as a gypsum board. In addition, when formed into a sheet shape, the heat storage molded body can be easily wound up into a roll or lamination-processed with other functional layers such as a printed pattern layer and a heat conduction layer, also has excellent cuttability and processability, and thus can be used in various applications.

Further, the heat storage molded body is easy to mold at a low temperature, and also the breakage of the heat storage medium is unlikely to occur. As a result, the bleed-out of a plasticizer or a heat storage medium is likely to be suppressed. Accordingly, a protective layer or the like for suppressing the bleed-out of a heat storage medium is not required, and such a heat storage molded body can also be distributed or used alone.

Such a heat storage molded body of one or more embodiments of the present invention can be used for various applications and favorably contribute to energy saving in various applications, including a wall material or wall paper in a residential space of a house or the like, an indoor space of an automobile, train, aircraft, agricultural house, or the like, further a closed space inside a refrigerator of a refrigerator car or refrigeration facility or inside an aircraft, and a material applied to a heat-generating electrical component, such as the CPU of a personal computer or a storage battery, for example.

DETAILED DESCRIPTION OF EMBODIMENTS

The heat storage molded body according to one or more embodiments of the present invention is a heat storage molded body including a heat storage medium dispersed in a resin matrix. The resin matrix includes a resin composition containing a thermoplastic resin and a plasticizer. The plasticizer is a non-phthalate plasticizer, and the HSP distance between the plasticizer and the heat storage medium is 6 or more.

[Thermoplastic Resin]

The thermoplastic resin used in embodiments according to the present invention is not particularly limited as long as it is a resin capable of forming a resin matrix with a plasticizer. Examples thereof include vinyl chloride resins, acrylic resins, urethane resins, olefin resins, ethylene-vinyl acetate copolymerization, styrene-butadiene resins, polystyrene resins, polybutadiene resins, polyester resins, polyamide resins, polyimide resins, polycarbonate resins, 1,2-polybutadiene resins, polycarbonate resins, and polyimide resins. In one or more embodiments, it is preferable to use a vinyl chloride resin, since moldability at a low temperature and the dispersibility of the heat storage medium are easily provided.

In the case where a vinyl chloride resin is used, a vinyl sol coating liquid containing vinyl chloride resin particles can be used to form a sol cast film. This allows the heat storage molded body to be formed at a low temperature. The vinyl sol coating liquid is a coating liquid in paste form in which a heat storage medium is dispersed and suspended in a resin composition containing vinyl chloride resin particles and a plasticizer.

In one or more embodiments, the average particle size of the vinyl chloride resin particles is 0.01 to 10 μm or 0.1 to 5 μm. In the coating liquid, the particles as primary particles may be directly dispersed. Alternatively, a coating liquid where spherical secondary particles each composed of aggregated primary particles are dispersed may be used. In addition, it is also possible that particles having different particle sizes are mixed, and the particle size distribution has two or more peaks. The particle size can be measured by a laser method or the like.

For the reason that favorable fluidity is likely to be obtained and the aging viscosity change is small, in one or more embodiments, it is preferable that the shape of the vinyl chloride resin particles used for the vinyl sol coating liquid is approximately spherical. Since a spherical shape is likely to be obtained and also the particle size distribution is likely to be controlled, the vinyl chloride resin particles may be produced by emulsion polymerization or suspension polymerization.

In one or more embodiments, the polymerization degree of the vinyl chloride resin to be used is 500 to 4,000 or 600 to 2,000.

As the vinyl chloride resin particles used in one or more embodiments of the present invention, commercially available vinyl chloride resin particles may be suitably used. Examples thereof include ZEST PQ83, PWLT, PQ92, P24Z, and the like, manufactured by Shin Dai-Ichi Vinyl Corporation and PSL-675, 685, and the like, manufactured by Kaneka Corporation.

[Plasticizer]

The plasticizer used in one or more embodiments of the present invention is a non-phthalate plasticizer, excluding phthalate plasticizers whose adverse effects on human health are concerned. As such plasticizers, epoxy plasticizers, methacrylate plasticizers, polyester plasticizers, polyether ester plasticizers, aliphatic diester plasticizers, trimellitate plasticizers, adipate plasticizers, benzoate plasticizers, and the like may be suitably used. In addition, two or more kinds of plasticizers may be mixed arbitrarily and then used.

In one or more embodiments of the present invention, with respect to the above plasticizers and the like, a plasticizer whose HSP distance from the heat storage medium used is 6 or more is used. As a result, the desorption of components which may be desorbed from the heat storage molded body at high temperatures can be suppressed, and favorable heat resistance such that volumetric shrinkage is unlikely to occur even at high temperatures can be achieved. In a molded article that contains no heat storage medium and is made of an ordinary resin composition containing a thermoplastic resin and a plasticizer, significant volumetric shrinkage is unlikely to occur even at high temperatures. However, in a heat storage molded body containing a heat storage medium, significant volumetric shrinkage may occur at high temperatures. It has been found that when the HSP distance between the heat storage medium and the plasticizer is within the above range, the incorporation of the plasticizer into the heat storage medium, which causes the formation of a large amount of desorption components at high temperatures, can be suppressed, and therefore, volumetric shrinkage at high temperatures can be suppressed. Accordingly, a heat storage molded body having excellent heat resistance can be achieved. The HSP distance may be 7 or more, or 8 or more, in terms of easily providing favorable heat resistance. In addition, the upper limit is not particularly set as long as the plasticizer to be used is one commonly used as a plasticizer. In one or more embodiments, the HSP distance may be 40 or less, or 30 or less, or 25 or less, in terms of easily providing favorable compatibility and moldability.

The HSP distance is an index that represents the solubility between substances using Hansen solubility parameters (HSP). A Hansen solubility parameter expresses solubility with a multidimensional (typically three dimensional) vector, and such a vector can be defined by a dispersion component, a polar component, and a hydrogen bonding component. Then, the similarity between the vectors is expressed as the distance between the Hansen solubility parameters (HSP distance).

As Hansen solubility parameters, referential numerical values are shown in various references, including Hansen Solubility Parameters: A User's Handbook (Charles Hansen, et. al., 2007, second edition), for example. In addition, Hansen solubility parameters may also be calculated using a commercially available software, such as Hansen Solubility Parameter in Practice (HSPiP), based on the chemical structure of the substance. Calculation is performed taking a solvent temperature as 25° C.

In addition, in one or more embodiments of the present invention, the HSP distance between the thermoplastic resin and plasticizer used may be 15 or less, or 12 or less, in terms of favorably forming the resin matrix of the molded body. In addition, the lower limit is not particularly set, but may be 1 or more, or 2 or more, or 3 or more.

In one or more embodiments of the present invention, according to the heat storage medium to be used, a plasticizer that provides the above HSP value can be suitably selected from non-phthalate plasticizers. For example, in the case where a heat storage medium having an acrylic outer shell is used, it may be preferable to use an epoxy plasticizer, a polyester plasticizer, a trimellitate plasticizer, or the like. In addition, in the case where a heat storage medium having a melamine outer shell is used, it may be preferable to use an epoxy plasticizer, a polyester plasticizer, a trimellitate plasticizer, a benzoate plasticizer, or the like.

As these plasticizers, various commercially available plasticizers may be suitably used. Examples of the epoxy plasticizer include Monocizer W-150 manufactured by DIC Corporation; Sansocizer E-PS, E-PO, E-4030, E-6000, E-2000H and E-9000H manufactured by New Japan Chemical Co., Ltd.; ADK CIZER O-130P, O-180A, D-32, and D-55 manufactured by ADEKA Corporation, and KAPOX S-6 manufactured by Kao Corporation. Examples of the polyester plasticizer include Polycizer W-2050, W-2310, and W-230H manufactured by DIC Corporation; ADK CIZER PN-7160, PN-160, PN-9302, PN-150, PN-170, PN-230, PN-7230, and PN-1010 manufactured by ADEKA Corporation, D620, D621, D623, D643, D645, and D620N manufactured by Mitsubishi Chemical Corporation; and HA-5 manufactured by Kao Corporation. Examples of the trimellitate plasticizer include Monocizer W-705 manufactured by DIC Corporation, ADK CIZER C-9N manufactured by ADEKA Corporation, and TOTM and TOTM-NB manufactured by Mitsubishi Chemical Corporation. Examples of the benzoate plasticizer include Monocizer PB-3A manufactured by DIC Corporation and JP120 manufactured by Mitsubishi Chemical Corporation.

In one or more embodiments of the present invention, since the bleed-out of a heat storage medium or a plasticizer is likely to be suppressed, among the above plasticizers, a plasticizer that can be gelled at a low temperature may be used. In one or more embodiments, with respect to such a plasticizer, the gelation end temperature may be 150° C. or less, or 140° C. or less, or 130° C. or less, or 120° C. or less, or 110° C. or less. With respect to the gelation end temperature, the temperature at which the optical transparency of the gelled film becomes constant can be defined as the gelation end temperature. As such a plasticizer having excellent low-temperature moldability, it may be preferable to use an epoxy plasticizer, a polyester plasticizer, or a benzoate plasticizer, and, in terms of the heat resistance and low-temperature moldability described above, it may be preferable to use an epoxy plasticizer or a polyester plasticizer. In addition, also in terms of toughness, an epoxy plasticizer or a polyester plasticizer may be used, and an epoxy plasticizer may be preferable.

The gelation end point temperature is specifically defined as follows. A composition obtained by mixing a vinyl chloride resin for paste (polymerization degree: 1,700), the above plasticizer, and a heat stabilizer (Ca-Zn) at a mass ratio of 100/80/1.5 is sandwiched between a glass plate and a cover glass, and the temperature is raised at a temperature rise rate of 5° C./min. Changes in optical transparency are observed using a hot stage for microscopic observation (Metter 800), and the temperature at which the optical transparency becomes constant is defined as the gelation end point temperature.

In one or more embodiments, the plasticizer used in the present invention has a viscosity at 25° C. of 1,500 mP·.s or less, or 1,000 mPa·s or less, or 500 mPa·s or less, or 300 mPa·s or less. Within such a range, the viscosity of the vinyl sol coating liquid can be kept low, and thus the packing density of the heat storage medium can be increased. Incidentally, with respect to the conditions for plasticizer viscosity measurement, the viscosity can be measured under the conditions in the examples below.

In one or more embodiments, the plasticizer has a weight average molecular weight of 200 to 3,000 or of 300 to 1,000. Within such a range, the plasticizer itself is unlikely to bleed out, also the viscosity of the vinyl sol coating liquid can be kept low, and thus the packing density of the heat storage medium can be increased. Incidentally, the weight average molecular weight (Mw) is a polystyrene-equivalent value based on gel permeation chromatography (hereinafter abbreviated to "GPC") measurement. Incidentally, GPC measurement can be performed under the following conditions.
(Weight Average Molecular Weight Measurement Conditions)
    Measuring device: Guard column "HLC-8330" manufactured by Tosoh Corporation
    Column: "TSK Super H-H" manufactured by Tosoh Corporation
    +"TSK gel Super HZM-M" manufactured by Tosoh Corporation
    +"TSK gel Super HZM-M" manufactured by Tosoh Corporation
    +"TSK gel Super HZ-2000" manufactured by Tosoh Corporation
    +"TSK gel Super HZ-2000" manufactured by Tosoh Corporation
    Detector: RI (differential refractometer)
    Data processing: "GPC-8020 Model II, Version 4.10" manufactured by Tosoh Corporation
    Column temperature: 40° C.
    Developing solvent: Tetrahydrofuran (THF)
    Flow rate: 0.35 mL/min
    Sample: Prepared by filtering a tetrahydrofuran solution having a resin solid content of 1.0 mass % through a microfilter (100 µl)
    Reference sample: In accordance with the measurement manual of the above "GPC-8020 Model II, Version 4.10", monodisperse polystyrene having a known molecular weight was used.
(Reference Sample: Monodisperse Polystyrene)
    "A-300" manufactured by Tosoh Corporation
    "A-500" manufactured by Tosoh Corporation
    "A-1000" manufactured by Tosoh Corporation
    "A-2500" manufactured by Tosoh Corporation
    "A-5000" manufactured by Tosoh Corporation
    "F-1" manufactured by Tosoh Corporation
    "F-2" manufactured by Tosoh Corporation
    "F-4" manufactured by Tosoh Corporation
    "F-10" manufactured by Tosoh Corporation
    "F-20" manufactured by Tosoh Corporation
    "F-40" manufactured by Tosoh Corporation
    "F-80" manufactured by Tosoh Corporation
    "F-128" manufactured by Tosoh Corporation
    "F-288" manufactured by Tosoh Corporation
[Heat Storage Medium]

In one or more embodiments, the heat storage medium used in the present invention is not particularly limited as long as the HSP distance from the plasticizer to be used is within the above range, and various known heat storage media may be used. Among them, in terms of providing easiness in handling or molding of a molded body, it may be preferable to use a latent heat storage medium that utilizes a solid-liquid phase change.

Considering not only the bleed-out at the time of melting due to a phase change, but also dispersibility at the time of being incorporated, the latent heat storage medium may be heat storage particles in which a latent heat storage material such as paraffin is encapsulated in an outer shell made of an organic material or the like. In the case where heat storage particles having such an outer shell are used in one or more embodiments of the present invention, the HSP distance is calculated based on the HSP of the material used for the outer shell of the heat storage particles. In the heat storage molded body of one or more embodiments of the present invention, even in the case where a heat storage medium containing a latent heat storage material such as paraffin in an outer shell made of an organic material is used, the embrittlement of the outer shell due to the plasticizer is unlikely to occur, and the heat storage medium is unlikely to break.

As such heat storage particles, for example, as those having an outer shell made of a melamine resin, Thermo Memory FP-16, FP-25, FP-31, and FP-39 manufactured by Mitsubishi Paper Mills Limited, Riken Resin PMCD-15SP, 25SP, and 32SP manufactured by Miki Riken Industrial Co., Ltd., and the like can be mentioned. In addition, as those having an outer shell made of silica, Riken Resin LA-15, LA-25, and LA-32 manufactured by Miki Riken Industrial Co., Ltd. and the like can be mentioned, and, as those having an outer shell made of a polymethyl methacrylate resin, Micronal DS5001X and 5040X manufactured by BASF and the like can be mentioned.

In one or more embodiments, the particle size of the heat storage particles is not particularly limited, but may be approximately from 10 to 1,000 μm, or approximately from 50 to 500 μm. With respect to the particle size of the heat storage particles, although the primary particles having a particle size within the above range may be preferable, secondary particles having a particle size within the above range, which are formed by the aggregation of primary particles having a particle size of 1 to 50 μm or of 2 to 10 μm, may also be preferable. Such heat storage particles are likely to break under pressure or shear. However, according to the structure of one or more embodiments of the present invention, the breakage of the heat storage particles can be favorably suppressed, and the bleed-out or leakage of the heat storage material is unlikely to occur. In particular, although breakage may be caused by the temperature in the case where the outer shell is made of an organic material, in the heat storage molded body of one or more embodiments of the present invention, even in the case where such a latent heat storage medium is used, the bleed-out or leakage of the heat storage material is likely to be favorably suppressed. Incidentally, not all the heat storage particles used in the heat storage molded body have to have a particle size within the above range. In one or more embodiments, 80 mass % or more, or 90 mass % or more, or 95 mass % or more of the heat storage particles in the heat storage molded body are heat storage particles within the above range.

The latent heat storage medium undergoes a phase change at a melting point of a specific temperature. That is, in the case where room temperature exceeds the melting point, the phase changes from solid to liquid, while in the case where room temperature falls below the melting point, the phase changes from liquid to solid. The melting point of the latent heat storage medium may be adjusted according to a use application thereof, and a material that shows a solid/liquid phase transition approximately in a temperature range of −20° C. to 120° C. may be suitably used. For example, for retaining a proper temperature in a residential space of a house or the like, an indoor space of an automobile, train, aircraft, agricultural house, or the like, etc., thereby achieving energy saving, a latent heat storage medium whose melting point is set at a temperature suitable for everyday life, specifically 10 to 35° C., or 15 to 30° C., is incorporated; as a result, the proper-temperature retention performance can be exhibited. More specifically, in the case where the proper-temperature retention performance for winter or summer is adjusted, for the purpose of achieving a sustained heating effect in winter, a latent heat storage medium having a melting point of approximately 25 to 28° C. is incorporated. Alternatively, for the purpose of achieving a sustained cooling efficiency in summer, a latent heat storage medium having a melting point of approximately 20 to 23° C. can be incorporated. In order to develop both effects, two or more kinds of latent heat storage media having different melting point designs may be incorporated. In addition, for achieving energy saving inside a refrigeration facility or the like, a latent heat storage medium having a melting point of approximately −10° C. to 5° C. may be used.

[Heat Storage Molded Body]

In one or more embodiments, the heat storage molded body of the present invention is a heat storage molded body including a heat storage medium dispersed in a resin matrix that includes a resin composition containing the thermoplastic resin and plasticizer described above. In one or more embodiments, the heat storage molded body of the present invention contains a resin component as a main component and thus has favorable flexibility. In addition, since a non-phthalate plasticizer is used as a plasticizer, the adverse effects of phthalate materials on human health are not a concern. In addition, since the HSP distance between the plasticizer and the heat storage medium in the heat storage molded body is 6 or more, volumetric shrinkage is reduced even at high temperatures, and favorable heat resistance can be achieved.

In one or more embodiments, the shape of the heat storage molded body of the present invention may be a suitable shape according to a use application thereof, but in one or more embodiments, it is a sheet shape. This is because such a heat storage molded body can be easily applied to various applications, including a wall material or wall paper in a residential space of a house or the like, for example. In addition, a heat storage molded body in a sheet shape can also be formed into a roll. As a result, it can be easily lamination-processed with other functional layers such as a printed pattern layer and a heat conduction layer, and also has excellent cuttability and processability.

In one or more embodiments, the thickness of the heat storage molded body of the present invention may be suitably adjusted according to a use application thereof. For example, when it is applied to a wall surface or the like in a closed space, since a favorable heat storage effect is likely to be obtained, it may be preferable that the thickness is 50 μm or more, or 100 μm or more, or 500 μm or more, or 1 mm or more. In addition, since favorable flexibility is likely to be obtained, it may be preferable that the thickness is 10 mm or less, or 6 mm or less, or 5 mm or less, or 3 mm or less. In order to further improve the heat storage properties, it may also be preferable that the heat storage molded body of one or more embodiments of the present invention is used as a laminate.

In one or more embodiments, the content of the thermoplastic resin in the heat storage molded body is 10 to 80 mass %, or 20 to 70 mass %, or 30 to 60 mass %. Within such a range, a flexible sheet is likely to be formed. In one or more embodiments, the content of the plasticizer in the heat storage molded body is 5 to 75 mass %, or 10 to 70 mass %, or 20 to 60 mass %. Within such a range, excellent coating suitability and moldability are likely to be obtained. In addition, in one or more embodiments, the content of the heat storage medium in the heat storage molded body is 10 to 80 mass %, or 20 to 70 mass %, or 30 to 60 mass %. Within such a range, an excellent heat storage effect is likely to be obtained, and excellent moldability is likely to be obtained.

In addition, in one or more embodiments, with respect to the content ratio of the plasticizer relative to the thermoplastic resin, the content of the plasticizer is 30 to 150 parts by mass, or 30 to 120 parts by mass, or 40 to 100 parts by mass per 100 parts by mass of the thermoplastic resin.

In one or more embodiments, the tensile strength of the heat storage molded body of the present invention is 0.1 MPa or more, or 0.3 MPa or more, or 0.6 MPa or more, or 1 MPa or more. When the tensile strength is as above, the resulting heat storage molded body is flexible but also tough, and favorable processability, handleability, conveying suitability, bending suitability, and the like are likely to be obtained. In one or more embodiments, the upper limit of the tensile strength is not particularly set, but may be approximately 15 MPa or less, or 10 MPa or less, or 5 MPa or less.

In one or more embodiments, the tensile elongation at break is 10% or more, or 15% or more, or 20% or more, or 25% or more. In one or more embodiments, the upper limit of the elongation is 1,000% or less, or 500% or less, or 300% or less, or 200% or less. When the elongation is within such a range, toughness as well as favorable flexibility can be achieved, and excellent processability, handleability, conveying suitability, bending suitability, and the like are likely to be obtained.

Tensile strength and tensile elongation at break are measured in accordance with JIS K6251. Specifically, a heat storage molded body is cut into a No. 2 dumbbell shape, and two gauge lines are provided at an initial gauge length of 20 mm to prepare a test piece. The test piece is attached to a tensile tester and pulled at a rate of 200 mm/min to break. At this time, the maximum force (N) until break and the gauge length (mm) at break are measured, and the tensile strength and the tensile elongation at break are calculated according to the following equations.

Tensile strength TS (MPa) is calculated according to the following equation.

$$TS = F_m/Wt$$

$F_m$: Maximum force (N)
W: Width of the parallel part (mm)
t: Thickness of the parallel part (mm)

Tensile elongation at break $E_b$ (%) is calculated using the following equation.

$$E_b = (L_b - L_0)/L_0 \times 100$$

$L_b$: Gauge length at break (mm)
$L_0$: Initial gauge length (mm)

With respect to the heat storage molded body of one or more embodiments of the present invention, a coating liquid obtained by mixing a resin composition containing a thermoplastic resin and a plasticizer with a heat storage medium is applied or placed in a mold having an arbitrary shape, followed by heating or drying, whereby a molded body having an arbitrary shape can be formed.

As a method for favorably obtaining a sheet-shaped heat storage laminate, a method including the following steps is favorable:

(1) a step of mixing a non-phthalate plasticizer and a heat storage medium having a HSP distance of 6 or more with a thermoplastic resin to prepare a coating liquid; and (2) a step of applying the coating liquid onto a support to form a coating film and then heating the coating film at a temperature such that the temperature of the coating film is 150° C. or less, thereby forming a heat storage molded body.

A coating liquid is prepared in the step (1), and, in the step (2), the coating liquid is applied onto a support to obtain a coating film. As the support to be used here, in the case where the heat storage molded body is separated and then distributed or used, a support from which the obtained heat storage molded body can be separated and which has heat resistance to the temperature of the heating step may be suitably used. In addition, in the case where the heat storage molded body is laminated with other functional layers or a substrate and then used, such other functional layers or substrate may serve as the support.

As the support in the case where the heat storage molded body is to be separated, for example, resin films useful as various process films may be used. Examples of such resin films include polyester resin films such as a polyethylene terephthalate resin film and a polybutylene terephthalate resin film. The thickness of the resin film is not particularly limited, but those having a thickness of approximately 25 to 100 μm are easy to handle and obtain.

As a resin film to serve as the support, a film having a release-treated surface may be used. Examples of a release treatment agent for use in the release treatment include an alkyd resin, a urethane resin, an olefin resin, and a silicone resin.

For a method for casting film formation, which includes applying a vinyl sol coating liquid, a coating machine such as a roll knife coater, a reverse roll coater, or a comma coater can be used. Particularly, in one or more embodiments, a method which includes applying a vinyl sol coating liquid on a support and forming a coating film having a predetermined thickness with a doctor knife or the like may be employable.

In addition, in the step (2), the obtained coating film is gelled or cured by heating, thereby forming a heat storage molded body on the support. In one or more embodiments, the heating temperature is such that the coating film temperature is 150° C. or less, or 140° C. or less, or 130° C. or less, or 120° C. or less. When molding is performed at such a coating film temperature, the breakage of the heat storage medium due to heat can be favorably suppressed. The heating time may be suitably adjusted according to the gelation rate and the like, but may be adjusted at approximately 10 seconds to 10 minutes. In addition, drying, such as air-drying, may also be suitably used together with the heating.

In the case where a solvent is used in the coating liquid, the solvent may be removed at the same time with the heating step, but it may also be preferable to perform pre-drying before the heating.

The heat storage molded body formed above is subjected to a step of separating the heat storage molded body from the support, and thus can be used as a heat storage molded body. The separation may be performed by a suitable technique depending on the case. In addition, for performing various types of processing and laminating, in the case where the state of the heat storage molded body laminated on the support is desired, the heat storage molded body may also be distributed in the laminated state on the support.

In one or more embodiments, the method for producing a heat storage molded body of the present invention, production may be suitably performed by the above method. In one or more embodiments, a method thereof includes a method of sol casting using a vinyl sol coating liquid containing vinyl chloride resin particles as a thermoplastic resin to form a heat storage molded body in a sheet shape or the like. According to such a method, molding can be performed without kneading in a mixer or the like, extrusion molding, or the like, whereby the heat storage medium is unlikely to break, and the bleed-out of the heat storage medium from the obtained heat storage molded body, for example, is unlikely to occur. In addition, according to this method, molding at a low temperature is facilitated, and thus the breakage of the heat storage medium due to heat is likely to be suppressed.

In one or more embodiments, in the case of a vinyl sol coating liquid containing a vinyl chloride resin, the content of the vinyl chloride resin is 10 to 80 mass %, or 20 to 70 mass %, or 30 to 60 mass % of the solid contents (components other than the solvent) of the coating liquid. In addition, in one or more embodiments, the content of the plasticizer is 30 to 150 parts by mass, or 30 to 120 parts by mass, or 40 to 100 parts by mass per 100 parts by mass of the thermoplastic resin contained in the resin composition. Further, in one or more embodiments, the content of the heat storage medium mixed with the coating liquid is 10 to 80 mass %, or 20 to 70 mass %, or 30 to 60 mass % of the solid contents of the coating liquid.

In the vinyl sol coating liquid, a solvent may also be suitably used. As the solvent, solvents used for a vinyl chloride resin sol casting method may be suitably used. Among them, ketones such as diisobutyl ketone and methyl isobutyl ketone, esters such as butyl acetate, glycol ethers, and the like may be used. These solvents are likely to slightly swell the resin at ordinary temperature to enhance dispersion, and also promote melting and gelation in the heating step. These solvents may be used alone or a mixture of two or more thereof may be used.

In addition, together with the solvent, a dilution solvent may also be used. As the dilution solvent, it may be preferable to use a solvent that does not dissolve the resin and suppresses the swellability of the dispersion solvent. As such a dilution solvent, for example, paraffinic hydrocarbons, naphthenic hydrocarbons, aromatic hydrocarbons, terpene hydrocarbons, or the like may be used.

In the vinyl sol coating liquid, it may also be preferable to add a heat stabilizer in order to suppress the decomposition/degradation or coloring of the vinyl chloride resin, which is caused mainly by a dehydrochlorination reaction. As the heat stabilizer, for example, calcium/zinc stabilizers, octyl tin stabilizers, barium/zinc stabilizers, or the like may be used. In one or more embodiments, the content of the heat stabilizer is 0.5 to 10 parts by mass per 100 parts by mass of the vinyl chloride resin.

As components other than those described above, the vinyl sol coating liquid may also suitably contain an additive as necessary, such as viscosity depressants, dispersants, and anti-foaming agents. In one or more embodiments, the content of each additive is 0.5 to 10 parts by mass per 100 parts by mass of the vinyl chloride resin.

The viscosity of the vinyl sol coating liquid at the time of coating may be suitably adjusted according to the desired sheet thickness, coating conditions, and the like. However, in terms of easily providing excellent coating suitability, the viscosity may be 1,000 mPa·s or more, or 3,000 mPa·s or more, or 5,000 mPa·s or more. In addition, in one or more embodiments, the upper limit of the viscosity is 50,000 mPa·s or less, or 30,000 mPa·s or less, or 27,000 mPa·s or less, or 25,000 mPa·s or less. Incidentally, the coating liquid viscosity can be measured with a Brookfield viscometer.

In the heat storage molded body formed of a sol cast film of a vinyl sol coating liquid containing vinyl chloride resin particles and a heat storage medium, since the heat storage medium is not subjected to shear or pressure during production, the heat storage medium is unlikely to break. Accordingly, even though a resin-based material is used, the bleed-out of the heat storage medium is unlikely to occur. In addition, together with the heat storage properties given by the heat storage medium, excellent flexibility can also be achieved. Further, the heat storage molded body can also be easily laminated with other layers or processed, and thus can be used for various applications or various aspects.

[Heat Storage Laminate]

The heat storage molded body of one or more embodiments of the present invention may be laminated with various functional layers to form a heat storage laminate. For example, it is possible that the heat storage molded body is laminated with a nonflammable layer such as a nonflammable paper, thereby improving the flame retardancy, which is particularly favorable for application to a residential space. In addition, for example, it is also possible that the heat storage molded body is laminated with a heat diffusion layer or a heat insulation layer, thereby developing the heat storage properties more effectively. In addition, for application to an interior wall in a residential space or the like, a printed pattern layer or a decoration layer may also be provided.

In one or more embodiments, as a laminated structure with a nonflammable layer, a structure in which a nonflammable paper is laminated on one or both sides of the heat storage molded body can be exemplified. As a structure in which a nonflammable paper is laminated on one side, the structure may be such that the heat storage molded body of one or more embodiments of the present invention is attached to a nonflammable paper. However, it may be preferable in terms of easy formation that a vinyl sol coating liquid for forming the heat storage molded body of one or more embodiments of the present invention is directly applied onto a nonflammable paper and gelled. In addition, as a structure in which a nonflammable paper is present on both sides, a nonflammable paper may be attached to both sides of the heat storage molded body of one or more embodiments of the present invention. However, such a structure can be easily formed by applying a vinyl sol coating liquid onto a nonflammable paper and laminating the resulting nonflammable-paper-laminated heat storage molded bodies such that the gelled heat storage molded body sides face each other.

The nonflammable paper is not particularly limited as long as it has nonflammability. For example, it is possible to use a paper provided with a flame retardant by coating, impregnation, or internal addition. Examples of flame retardant include metal hydroxides such as magnesium hydroxide and aluminum hydroxide, basic compounds such as phosphates, borates, and sulfamates, and glass fibers.

In the case where the heat storage molded body is laminated with a heat diffusion layer and applied to a closed space such as an indoor space, the heat diffusion layer has the effect of uniformizing heat in the indoor space. At the same time, heat from the indoor space (a residential space of a house or the like, an indoor space of an automobile, train, aircraft, or the like, a closed space inside a refrigerator of a refrigerator car or inside an aircraft or the like, etc.) can be dispersed and transferred to the heat storage layer with less heat resistance. In the heat storage layer, heat storage particles absorb heat from the indoor space or release heat into the indoor space, whereby the temperature environment in the indoor space can be controlled at a proper temperature.

As the heat diffusion layer, a layer having a high heat conductivity of 5 to 400 W/m·K can be used. Because of the high heat conductivity, locally concentrated heat is diffused and transferred to the heat storage layer, whereby the heat efficiency is improved, and also room temperature can be uniformized.

Examples of the material for the heat diffusion layer include aluminum, copper, iron, and graphite. In one or more embodiments of the present invention, it is particularly favorable to use aluminum. As a reason why aluminum is favorable, its capability of also developing a heat insulation effect by the reflection of radiant heat can be mentioned. In particular, in a heating appliance using radiant heat, the heating efficiency can be improved by the heat insulation effect. Examples of the heating appliance mainly utilizing radiant heat include electrical floor heaters, hot-water floor heaters, and infrared heaters. In addition, also from the viewpoint of disaster prevention, the flame retardancy can be improved.

With respect to the form of the heat diffusion layer, it may be used in a suitable form, such as a layer formed of a sheet of the above material or a deposition layer of the above material. In the case where aluminum is used as the material, it may be preferable to use an aluminum foil, an aluminum deposition layer, or the like having bendability, for example.

The thickness of the heat diffusion layer is not particularly limited. However, since favorable heat diffusibility and handleability are likely to be ensured, it may be preferable that the thickness is approximately from 3 to 500 μm.

In addition, in the case where a heat insulation layer is laminated on the heat storage layer, the heat storage layer effectively absorbs heat from or releases heat into the indoor side, whereby the effect of retaining a proper temperature in the indoor space can be particularly favorably exhibited. In addition, this is also effective in preventing the outflow of heat from the indoor space or reduce the influence of heat from the outdoor air. Because of these complex actions, the heat storage laminate of one or more embodiments of the present invention suppresses temperature changes in an indoor space, and the indoor space can be maintained at a proper temperature. In addition, in the case where an air conditioner or an air conditioner in a refrigeration facility or the like is used, its energy consumption can also be reduced. This can favorably contribute to energy saving in an indoor space.

As the heat insulation layer, it may be preferable to use a layer having a heat conductivity of less than 0.1 W/m·K. The heat insulation layer exhibits the effect of preventing the outflow of heat from the heat storage layer to the outdoor air and also reducing the influence of the outdoor air temperature. The heat insulation layer is not particularly limited as long as it is capable of forming a layer having a heat conductivity of less than 0.1 W/m·K. For example, a heat insulation sheet such as a foamed resin sheet or a resin sheet containing a heat insulation material, a heat insulation board of extruded polystyrene, expanded polystyrene, polyethylene foam, urethane foam, phenol foam, or the like, etc., may be suitably used. Among them, since workability is likely to be ensured, a heat insulation sheet may be preferable, and since heat conductivity can be reduced, a resin sheet containing a heat insulation material may be more preferable. In addition, foamed sheets are easy to obtain and inexpensive.

When the heat insulation layer has a sheet shape, workability is likely to be ensured. In particular, in one or more embodiments, the value measured using a cylindrical mandrel bending tester (JIS K 5600) is 2 to 32 mm as the mandrel diameter.

The heat insulation material used in the heat insulation layer serves to increase the heat insulation properties of the heat storage laminate. Examples thereof include porous silica, porous acrylic, hollow glass beads, vacuum beads, and hollow fibers. As the heat insulation material 5, a known material may be used. In one or more embodiments of the present invention, it is particularly favorable to use porous acrylic. The particle size of the heat insulation material is not limited, but may be approximately from 1 to 300 μm.

In the case where a resin sheet containing a heat insulation material is used as the heat insulation layer, the heat insulation material is incorporated into a resin material as a base and formed into a sheet. Examples of the resin material include, as described above, polyvinyl chloride, polyphenylene sulfide, polypropylene, polyethylene, polyester, and acrylonitrile-butadiene-styrene resins. As the polyester, A-PET, PET-G, and the like may be used. Among them, in terms of low flammability in case of fire, a vinyl chloride resin may be used, which is a self-extinguishing resin.

As a method for sheet formation, for example, a vinyl chloride resin, a plasticizer, and a heat insulation material are formed into a sheet using a machine for molding, such as extrusion molding or calender molding.

In one or more embodiments, the content of the heat insulation material in the heat insulation layer is 20 mass % or more of the heat insulation layer. In one or more embodiments, the content is 20 to 80 mass %, or 30 to 80 mass %, or 40 to 80 mass %. When the content of the heat insulation material is within such a range, the heat insulation effect can be favorably exhibited, and also the formation of the heat insulation layer is facilitated.

In the heat insulation layer, as necessary, additives such as plasticizers and flame retardants may be blended.

The thickness of the heat insulation layer is not particularly limited. However, the higher the thickness, the higher the temperature retainability in an indoor space. In order for the layer to have bendability and workability as a sheet, it may be preferable that the thickness is approximately from 50 to 3,000 μm.

The heat storage molded body of one or more embodiments of the present invention is favorable mainly for interior material applications including the interior wall, ceiling, floor, and the like of a building, but is also applicable to a clothing material for window sash frames or an interior material for vehicles and the like. In addition, the applications are not limited to the interior wall, ceiling, and floor of a building, and one or more embodiments of the present invention can also be applied to an indoor space of an automobile, train, airplane, or the like. In addition, it can also be used as a low-temperature retention material for a refrigeration facility or a low-temperature retention material for a heat-generating electrical component such as the CPU of a personal computer or a secondary battery. In addition, it may also be used together with a heater such as a planar heating element to develop the energy saving effect by heat storage.

EXAMPLES

Example 1

A plastisol coating liquid was prepared by blending 100 parts by mass of polyvinyl chloride resin particles having a polymerization degree of 900 (ZEST PQ92 manufactured by Shin Dai-Ichi Vinyl Corporation), 60 parts by mass of an epoxy plasticizer (Monocizer W-150 manufactured by DIC Corporation, viscosity: 85 mPa·s, gelation end point temperature: 121° C.), and 3 parts by mass of a heat stabilizer (Grec ML-538 manufactured by Showa Varnish Co., Ltd.) together with, as other additives, 6 parts by mass of a viscosity depressant (viscosity depressant VISCOBYK-5125 manufactured by BYK) and 3 parts by mass of a dispersant (Disperplast-1150 manufactured by BYK), as well as 60 parts by mass of a latent heat storage medium obtained by microencapsulating paraffin with an outer shell made of a polymethyl methacrylate (PMMA) resin (Micronal DS5001X manufactured by BASF, particle size: 100 to 300 μm, melting point: 26° C.). The calculated value of the HSP distance between the used plasticizer and latent heat storage medium was 8.88, the calculated value of the HSP distance between the plasticizer and vinyl chloride resin was 4.6, and the viscosity of the coating liquid immediately after blending and mixing to perform homogenization was 7,000 mPa·s. The mixture was applied onto a PET film using a 5-mm applicator and then gelled by heating at a dryer temperature of 150° C. for 8 minutes, thereby forming a heat storage molded body having a thickness of 3 mm. The tensile strength was 2.06 MPa, and the tensile elongation at break was 114.6%.

Example 2

A heat storage molded body was formed in the same manner as in Example 1, except that the epoxy plasticizer used in Example 1 was replaced with a polyester plasticizer (Polycizer W-230H manufactured by DIC Corporation, viscosity: 220 mPa·s, gelation end point temperature: 136° C.). Incidentally, the calculated value of the HSP distance between the used plasticizer and the used latent heat storage medium was 11.04, the calculated value of the HSP distance between the plasticizer and the vinyl chloride resin was 6.4, and the viscosity of the coating liquid was 8,500 mPa·s. The tensile strength of the obtained heat storage molded body was 1.10 MPa, and the tensile elongation at break was 81.8%.

Example 3

A heat storage molded body was formed in the same manner as in Example 1, except that the epoxy plasticizer used in Example 1 was replaced with a trimellitate plasticizer (Monocizer W-705 manufactured by DIC Corporation, viscosity: 220 mPa·s, gelation end point temperature: 143° C.). Incidentally, the calculated value of the HSP distance between the used plasticizer and the used latent heat storage medium was 9.07, the calculated value of the HSP distance between the plasticizer and the vinyl chloride resin was 4.1, and the viscosity of the coating liquid was 8,500 mPa·s. The obtained heat storage molded body was hardly elongated.

Example 4

A heat storage molded body was formed in the same manner as in Example 1, except that 60 parts by mass of a latent heat storage medium used in Example 1 was replaced with 80 parts by mass of a latent heat storage medium obtained by microencapsulating paraffin with an outer shell made of a melamine resin (Thermo Memory FP-25 manufactured by Mitsubishi Paper Mills Limited, average particle size: 50 μm, melting point: 25° C.). Incidentally, the calculated value of the HSP distance between the used plasticizer and the used latent heat storage medium was 22.30, and the viscosity of the coating liquid was 8,000 mPa·s. The tensile strength of the obtained heat storage molded body was 1.67 MPa, and the tensile elongation at break was 70.1%.

Example 5

A heat storage molded body was formed in the same manner as in Example 4, except that the epoxy plasticizer used in Example 4 was replaced with a polyester plasticizer (Polycizer W-230H manufactured by DIC Corporation, viscosity: 220 mPa·s, gelation end point temperature: 136° C.). Incidentally, the calculated value of the HSP distance between the used plasticizer and the used latent heat storage medium was 23.20, and the viscosity of the coating liquid was 12,000 mPa·s. The tensile strength of the obtained heat storage molded body was 0.72 MPa, and the tensile elongation at break was 31.0%.

Example 6

A heat storage molded body was formed in the same manner as in Example 4, except that the epoxy plasticizer used in Example 4 was replaced with a benzoate plasticizer (Monocizer PB-10 manufactured by DIC Corporation, viscosity: 80 mPa·s, gelation end point temperature: 100° C. or less). Incidentally, the calculated value of the HSP distance between the used plasticizer and the used latent heat storage medium was 17.10, the calculated value of the HSP distance between the plasticizer and vinyl chloride resin was 1.4, and the viscosity of the coating liquid was 8,500 mPa·s. The tensile strength of the obtained heat storage molded body was 2.28 MPa, and the tensile elongation at break was 156.7%.

Comparative Example 1

A heat storage molded body was formed in the same manner as in Example 1, except that the epoxy plasticizer used in Example 1 was replaced with a benzoate plasticizer (Monocizer PB-10 manufactured by DIC Corporation, viscosity: 80 mPa·s, gelation end point temperature: 100° C. or less). Incidentally, the calculated value of the HSP distance between the used plasticizer and the used latent heat storage medium was 4.33, and the viscosity of the coating liquid was 8,500 mPa·s. The tensile strength of the obtained heat storage molded body was 3.50 MPa, and the tensile elongation at break was 222.9%.

Comparative Example 2

A heat storage molded body was formed in the same manner as in Example 1, except that the epoxy plasticizer used in Example 1 was replaced with a phthalate plasticizer (Sansocizer DINP manufactured by New Japan Chemical Co., Ltd., viscosity: 65 mPa·s). Incidentally, the calculated value of the HSP distance between the used plasticizer and the used latent heat storage medium was 8.77, the calculated value of the HSP distance between the plasticizer and the vinyl chloride resin was 3.7, and the viscosity of the coating liquid was 6,000 mPa·s.

The evaluation method for the coating liquids used in the above examples and comparative examples and the evaluation method for the obtained heat storage molded bodies are as follows.

<Plasticizer Viscosity Measurement Conditions>

Measuring device: Brookfield viscometer ("DVM-B Model" manufactured by Tokyo Keiki Inc.)

Measurement conditions: Temperature: 25° C., No. 2 Rotor, 30 rpm

<Coating Liquid Viscosity Measurement Conditions>

Measuring device: Brookfield viscometer ("BM Model" manufactured by Tokimec Inc.)

Measurement conditions: Temperature: 25° C., No. 4 Rotor, 12 rpm

<HSP Distance>

The HSP distance between the plasticizer and the latent heat storage medium and the HSP distance between the plasticizer and the vinyl chloride used in the examples and the comparative examples were calculated as follows.

Using the components of the solubility parameter calculated with HSPiP, that is, the dispersion component dD, the polar component dP, and the hydrogen bonding component dH, the HSP distance between Component A and Component B was calculated by the following equation.

$$\text{HSP distance} = [4(dDA-dDB)^2 + (dPA-dPB)^2 + (dHA-dHB)^2]^{0.5}$$

<Heat Storage Properties Evaluation Test>

A sheet prepared in each of the examples and the comparative examples was formed into a size of 50 mm in width×50 mm in length to prepare a specimen. Two such specimens were laminated, and a thermocouple was inserted at the center between the sheets. In an environmental test chamber, the temperature of the air around the laminated specimens was retained at 35° C. for 2 hours, then reduced to 5° C. over 50 minutes, and further retained at 5° C. for 1 hour. At this time, the period of time for which the temperature of the inside of the laminated specimens was retained at 28° C. to 20° C. was measured. Based thereon, the prolonged time of the proper-temperature retention time, namely, the difference from the 28° C. to 20° C. retention time of the temperature of the air around the laminated specimens (800 seconds) was calculated to evaluate the proper-temperature retainability. The evaluation criteria are as follows.

◉: Retention time is prolonged by +200 seconds or more.
○: Retention time is prolonged by +50 seconds or more and less than 200 seconds.
X: Retention time is prolonged by less than +50 seconds.

<Bleed-Out Evaluation Test>

A sheet prepared in each of the examples and the comparative examples was formed into a size of 50 mm in width×50 mm in length, and such sheets were laminated while interposing an oil-blotting paper of the same size therebetween to prepare a specimen. The specimen was pressure-bonded under a load of 50 g/cm² in a 40° C./50% RH environment for 15 hours. With respect to the bleed-out of the heat storage medium component from the sheets, staining on the oil-blotting paper was visually evaluated. The evaluation criteria are as follows.

○: No staining
Δ: Partial staining
X: Staining over the entire surface

<Heat Resistance Test (Weight Loss on Heating)>

A sheet produced in each of the examples and the comparative examples was formed into a size of 50 mm in width×50 mm in length. The sheet was allowed to stand in an 80° C. environment for one week, and the resulting mass change was measured. The evaluation criteria are as follows.

◉: Mass change of less than 10%
○: Mass change of 10% or more and less than 15%
X: Mass change of 15% or more <Toughness Evaluation Test (90° Bending Test and 180° Bending Test)>

A sheet produced in the examples and the comparative examples was formed into a size of 50 mm in width×50 mm in length. The sheet was bent at an angle of 90° or 180° and held, and the resulting sheet conditions were observed.

<Cutting Processability>

A sheet produced in the examples was cut-processed with a utility knife into a size of 50 mm in width×50 mm, and the cut surface was observed.

TABLE 1

|  |  |  | Example 1 | Example 2 | Example 3 | Example 4 | Example 5 | Example 6 | Comparative Example 1 | Comparative Example 2 |
|---|---|---|---|---|---|---|---|---|---|---|
| Resin | Vinyl chloride | ZEST PQ92 | 100 | 100 | 100 | 100 | 100 | 100 | 100 | 100 |
| Plasticizer | Epoxy | Monocizer W-150 | 60 |  |  | 60 |  |  |  |  |
|  | Polyester | Polycizer W-230H |  | 60 |  |  | 60 |  |  |  |
|  | Trimellitate | Monocizer W-705 |  |  | 60 |  |  |  |  |  |
|  | Benzoate | Monocizer PB-10 |  |  |  |  |  | 60 | 60 |  |
|  | Phthalate | DINP |  |  |  |  |  |  |  | 60 |
|  |  | Viscosity [mPa · s] | 85 | 220 | 220 | 85 | 220 | 80 | 80 | 78 |
|  |  | Gelation temperature (end point) [° C.] | 121 | 136 | 143 | 121 | 136 | <100 | <100 | 133 |
| Heat Storage Medium | Acrylic outer shell | Micronal 5001X | 60 | 60 | 60 |  |  |  | 60 | 60 |
|  | Melamine outer shell | Thermo Memory FP-25 |  |  |  | 80 | 80 | 80 |  |  |
| Additive | Heat stabilizer | Grec ML-538C | 3 | 3 | 3 | 3 | 3 | 3 | 3 | 3 |
|  | Viscosity depressant | Viscobyk 5125 | 6 | 6 | 6 | 6 | 6 | 6 | 6 | 6 |
|  | Dispersant | Disperplast 1150 | 3 | 3 | 3 | 3 | 3 | 3 | 3 | 3 |
| HSP Distance | Plasticizer-Heat storage medium |  | 8.88 | 11.04 | 9.07 | 22.30 | 23.20 | 17.10 | 4.33 | 8.77 |
|  | Thermoplastic resin-Plasticizer |  | 4.6 | 6.4 | 4.1 | 4.6 | 6.4 | 1.4 | 1.4 | 3.7 |
| Evaluation | Coating Liquid Viscosity [mPa · s] |  | 7000 | 8500 | 8500 | 8000 | 12000 | 8500 | 8500 | 6000 |
|  | Molded body temperature (maximum temperature) during molding [° C.] |  | 131.6 | 130.6 | 132.9 | 133.1 | 132.1 | 132 | 130.1 | 134.9 |
|  | Heat storage properties |  | ◉ | ◉ | ◉ | ◉ | ◉ | ◉ | ◉ | ◉ |
|  | Bleed-out |  | ○ | ○ | ○ | ○ | ○ | ○ | ○ | ○ |
|  | Heat resistance (80° C., 1 week) |  | ◉ | ◉ | ○ | ◉ | ◉ | ◉ | X | ○ |
|  | Environmental responsiveness |  | ○ | ○ | ○ | ○ | ○ | ○ | ○ | X |

As is clear from the table, the heat storage molded bodies of Examples 1 to 6 had favorable heat resistance while using a flexible resin-based sheet, and they were capable of achieving heat storage properties that can contribute to proper-temperature retention according to a use application thereof. Since phthalate materials are not used in the heat storage molded bodies of the examples, these heat storage molded bodies are less harmful to human health and thus can be favorably used even in the human living environment.

In addition, the heat storage molded bodies of Examples 1 to 6 were easy to cut with a utility knife. Further, the heat storage molded bodies of Examples 1 to 2 and 4 to 6 resulted in no cracking even in the 90° bending test, and also had favorable sheet formability even at a low temperature where the bleed-out of the heat storage medium hardly occur. In particular, the heat storage molded bodies of Examples 1, 4, and 6 resulted in no cracking even in the 180° bending test and had high toughness.

Meanwhile, the molded body of Comparative Example 1 showed a significant weight loss on heating at the high temperature, indicating poor heat resistance. In addition, the molded body of Comparative Example 2 uses a phthalate material, and thus is difficult to apply to a living environment, and also cracks appeared on the surface during the 90° bending test.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A heat storage molded body comprising
a heat storage medium dispersed in a resin matrix, wherein the heat storage medium is heat storage particles containing a latent heat storage material encapsulated therein and the latent heat storage material shows a solid/liquid phase transition in a temperature range of −20° C. to 120° C.,
wherein the resin matrix comprises a resin composition containing a thermoplastic resin and a non-phthalate plasticizer, and
wherein the Hansen Solubility Parameter (HSP) distance between the non-phthalate plasticizer and the heat storage medium is 6 or more.

2. The heat storage molded body according to claim 1, wherein the HSP distance between the non-phthalate plasticizer and the thermoplastic resin is 15 or less.

3. The heat storage molded body according to claim 1, wherein the non-phthalate plasticizer has a gelation end point temperature of 150° C. or less.

4. The heat storage molded body according to claim 1, wherein the heat storage molded body is molded at 150° C. or less.

5. The heat storage molded body according to claim 1, wherein the content of the non-phthalate plasticizer in the resin composition is from 30 to 150 parts by mass per 100 parts by mass of the thermoplastic resin.

6. The heat storage molded body according to claim 1, wherein the content of the heat storage medium in the heat storage molded body is from 10 to 80 mass %.

7. The heat storage molded body according to claim 1, wherein the heat storage molded body has a sheet shape.

8. A heat storage laminate comprising at least one of a heat diffusion layer and a heat insulation layer laminated on the heat storage molded body according to claim 1.

9. A heat storage laminate comprising a nonflammable layer laminated on the heat storage molded body according to claim 1.

* * * * *